Feb. 3, 1959  B. E. HOUSE  2,871,713
BRAKE MECHANISM
Filed Sept. 19, 1952  4 Sheets-Sheet 1
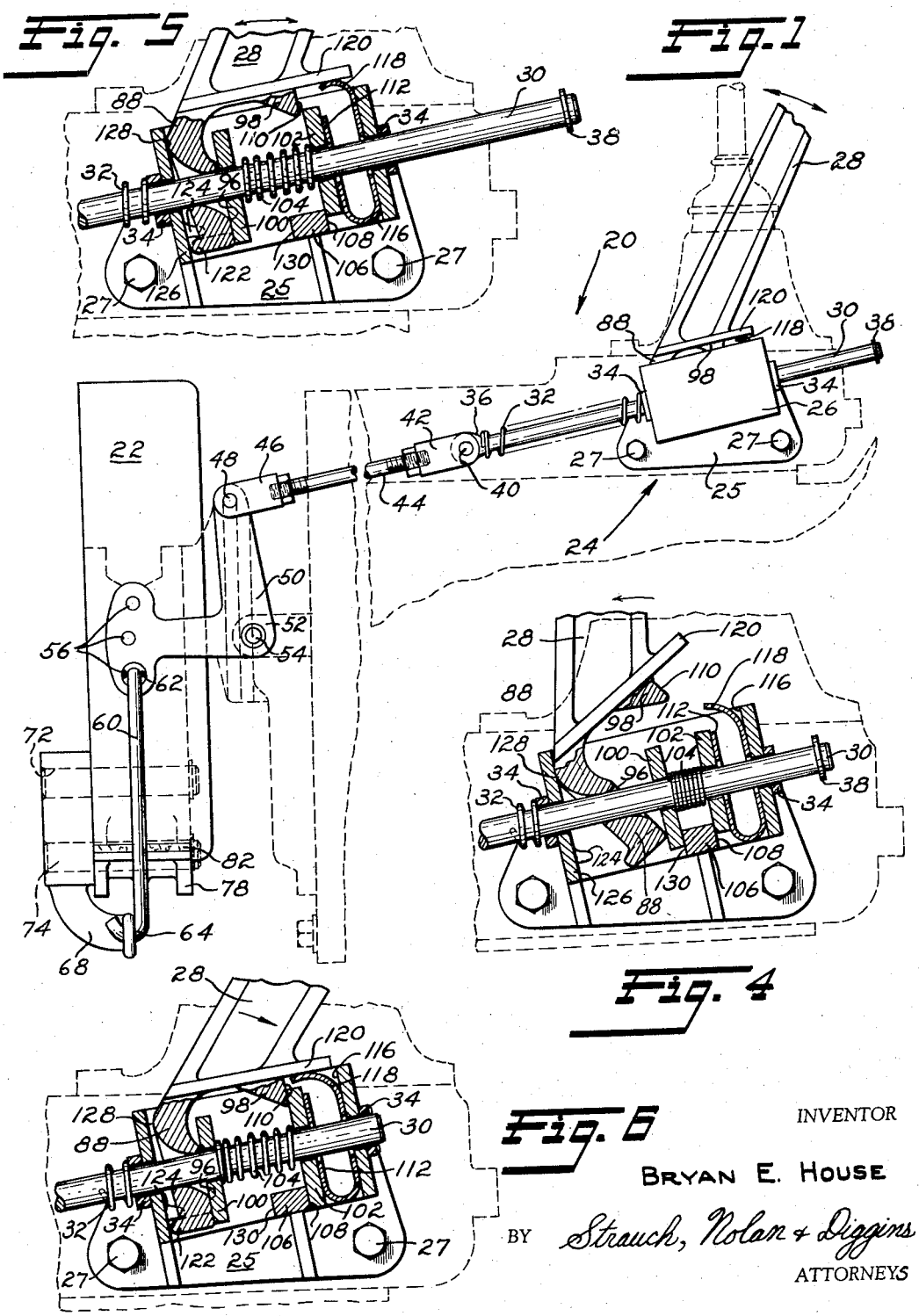
INVENTOR
BRYAN E. HOUSE
BY Strauch, Nolan & Diggins
ATTORNEYS

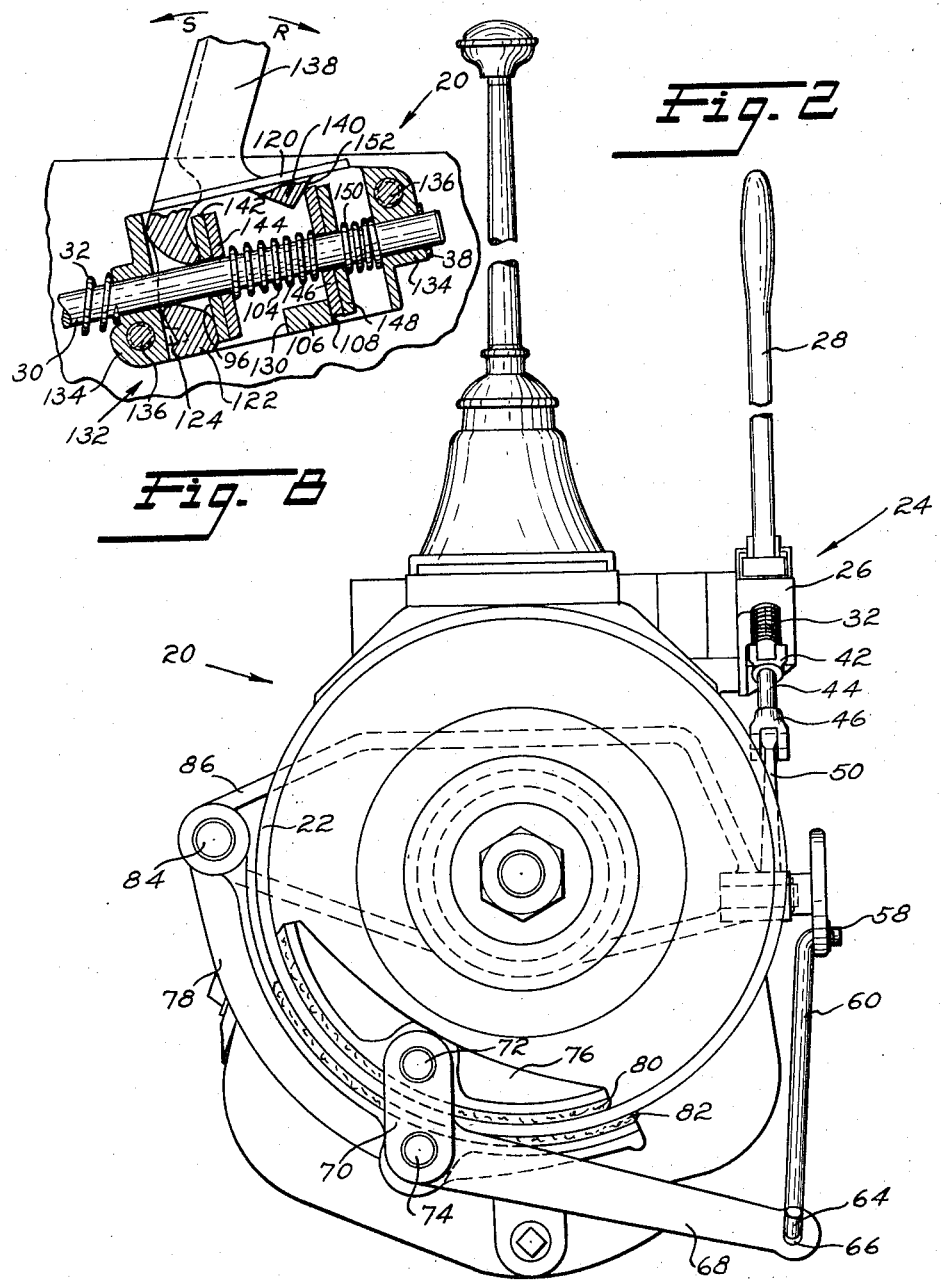

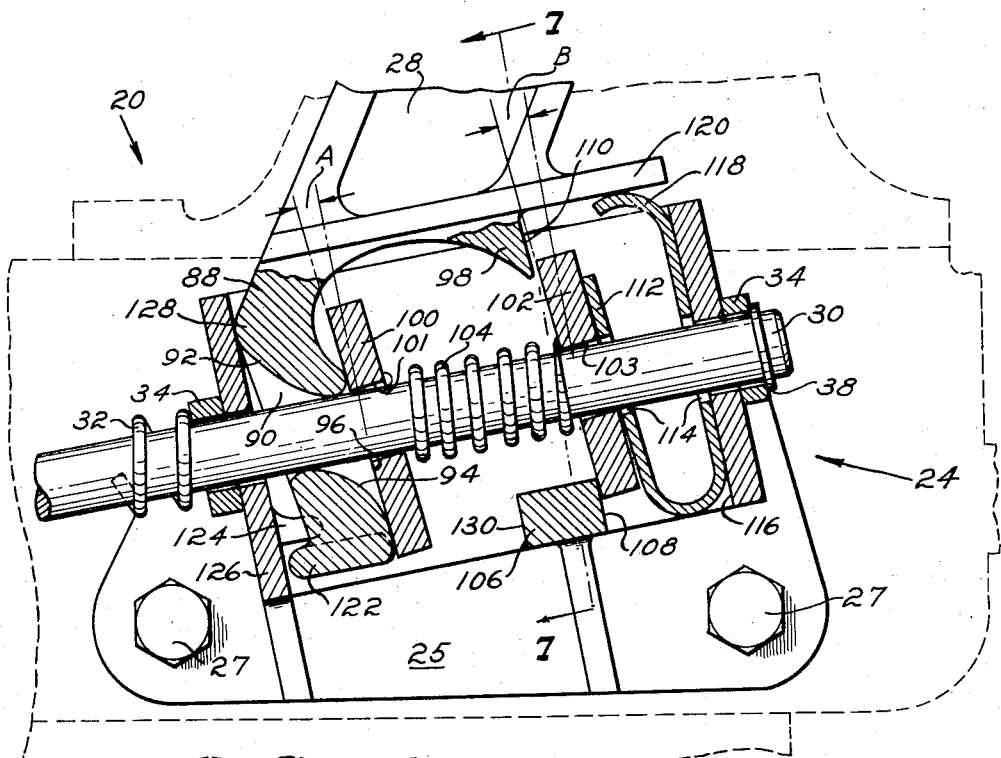
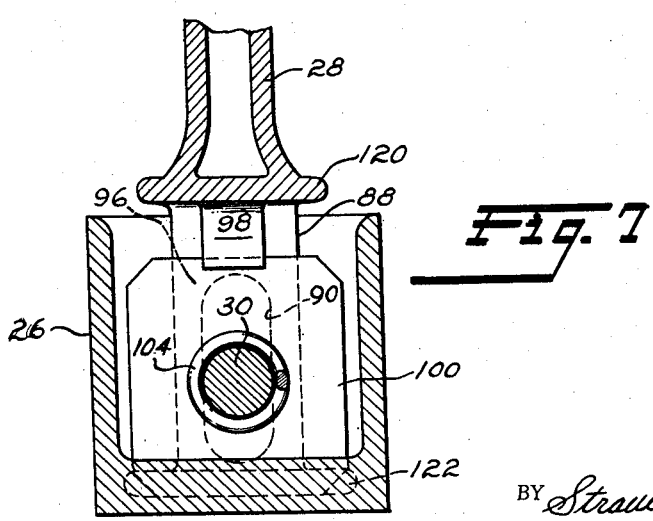

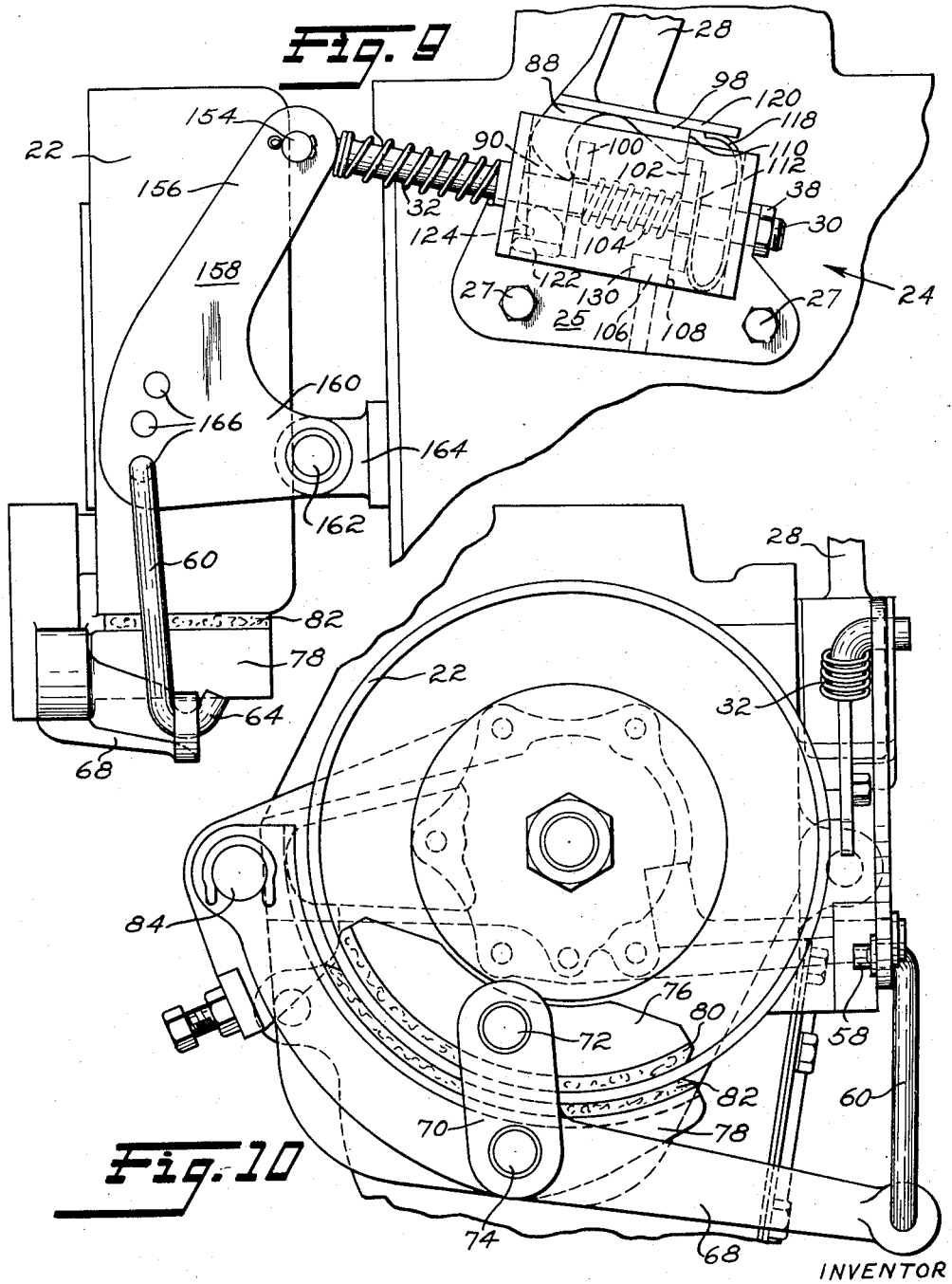

United States Patent Office 2,871,713
Patented Feb. 3, 1959

2,871,713

BRAKE MECHANISM

Bryan E. House, Ashtabula, Ohio, assignor, by mesne assignments, to Rockwell Standard Corporation, a corporation of Pennsylvania Application September 19, 1952, Serial No. 310,425

11 Claims. (Cl. 74—169)

This invention relates to brake mechanism and more particularly to actuating mechanism therefor.

In its preferred embodiment the invention will be described as applied to a vehicle emergency or parking brake wherein maximum available actuating force is always delivered to the brake without the necessiyt of frequent and bothersome adjustment of the mechanism and a simple actuating mechanism utilizes the full life of the brake lining, and which can be easily and positively set and equally easily released.

A common type of emergency brake control mechanism in use at the present time employs a ratchet and spring pressed pawl for maintaining the brake control or actuating mechanism and, consequently, the brakes in a set position. With this system it is not always possible to lock the brakes at the maximum braking condition, since it is possible that the pawl will, under the maximum braking condition, be located at the top of a ratchet tooth in a non-engaged position. As a result the brake actuating mechanism has to be slightly released so that the pawl will engage the next lower tooth on the ratchet, and full braking efficiency is lost.

The present invention contemplates an entirely new brake control mechanism which eliminates the foregoing difficulty and permits maximum braking efficiency throughout the life of the braking elements. This is accomplished through a novel wobble plate type of actuating mechanism as will appear. Wobble plate type brake actuating mechanisms are generally known and disclosed for example in U. S. Patents No. 2,220,131 and No. 2,180,307, and the present invention embodies important improvements thereover in certain details of structure and operation.

An important feature of the present invention is the incremental or step by step movement of the brake actuating mechanism until maximum braking force is attained, rather than a single stroke movement of the actuating mechanism which is very likely to be insufficient to attain maximum effective braking force. I provide locking means independent of, but coacting with the actuating mechanism, for maintaining the brake in each of its progressively set conditions to permit the actuating mechanism to be repositioned for moving the brakes to a successive position. The actuating mechanism of this invention thus does not set the brakes by a single movement of the actuating mechanism, as is the case with prior single acting wobble plate brakes which can easily result in incomplete setting of the brakes, but rather permits repeated actuating strokes until the brakes are positively and safely set. As a result the brake of the invention is always capable of delivering the maximum braking force even though it may be badly worn, without the necessity of bothersome adjustments.

Releasing of the known single acting wobble plate type of brake actuating mechanism has also been unsatisfactory since the release mechanism necessitated additional complex and expensive elements. The present invention presents a particularly advantageous and simple release mechanism employing the very same elements required for actuation, thus resulting in a simple, more efficient, and less expensive mechanism.

A major object of this invention is in the provision of a simple, durable and efficient multi-stroke operation brake control mechanism.

A further object of this invention is to provide a novel brake control mechanism having a simple lock for maintaining the brake in its set position after each progressive step and which finally locks the brake in its maximum set position.

Still a further object is to provide a novel multi-stroke brake control mechanism embodying a simple and effective means for releasing the brake from its locked position.

Another object is to provide a brake actuating mechanism embodying a plurality of wobble plates coacting in a novel manner with a brake connected rod for progressively actuating and locking the rod.

Yet another object is to provide a novel brake actuating mechanism embodying a plurality of resiliently biased wobble plates coacting with a brake connected rod and a special oscillatable actuating lever coacting with the wobble plates for incrementally moving the rod to actuate and release the brake.

These and other objects and advantages will appear from the following description and appended claims when read in conjunction with the attached drawings wherein:

Figure 1 is a side elevation of a brake actuating mechanism embodying the invention showing the motion transmitting mechanism connecting the actuator with an emergency brake;

Figure 2 is a front elevational view of the apparatus shown in Figure 1;

Figure 3 is an enlarged vertical section of the brake actuating mechanism of Figure 1, showing the actuating mechanism in the neutral position with the brake released;

Figure 4 is a view similar to that of Figure 3 only showing the actuating mechanism after the completion of a brake applying stroke;

Figure 5 is a viewe similar to that of Figure 3 but showing the actuating mechanism locked at the maximum brake setting after a series of strokes such as shown in Figure 4;

Figure 6 is also a view similar to that of Figure 3, but showing the actuating mechanism in a condition for releasing the brake;

Figure 7 is a cross-sectional view taken along the line 7—7 of Figure 3;

Figure 8 is a vertical sectional view of an actuating mechanism according to a further embodiment of the invention;

Figure 9 is a side elevation of a further embodiment of the invention wherein the brake actuating mechanism of Figures 1–7 is connected by a different motion transmitting means to the brake;

Figure 10 is a front elevation of the apparatus shown in Figure 9.

Referring to Figures 1–7 of the drawing wherein like reference numerals designate corresponding parts throughout the several figures, a transmission housing is generally designated 20 and a brake drum 22 is fixed in a conventional manner upon an output shaft (not shown) rearwardly of housing 20. A brake control mechanism generally designated 24 comprises a housing 26 mounted on transmission housing 20 as by plate 25 and bolts 27 and having a hand lever 28 pivotally mounted therein. A cylindrical actuating rod 30 is mounted to slide through housing 26 and is biased to the left in Figure 1 by a surrounding coiled compression spring 32 bearing at one end against a guide 34 on the exterior of housing 26 and at the other end against an enlarged portion 36 of rod 30. An abutment 38, such as a snap ring, is provided at the end of rod 30 that projects through the side of housing 26 opposite the spring to prevent the rod from passing all the way through housing 26 under the biasing effect of spring 32.

The enlarged end rod 30 has a pin 40 for pivotally mounting a clevis 42 at one end of a connecting rod 44, and a clevis 46 at the other end of rod 44 is pivotally connected as at 48 to one end of a bell crank lever 50 whose elbow 52 is pivotally connected at 54 to the transmission housing 20. The other end of bell crank lever 50 is provided with a series of circumferentially spaced apertures 56 for selectively receiving a hook 58 on one end of a link 60 and the parts are secured as by cotter pin 62. A hook 64 at the other end of link 60 operatively engages aperture 66 in a brake operating lever 68, so that reciprocation of rod 30 will be transmitted to lever 68.

Referring to Figure 2, lever 68 is provided with a rigid angular arm 70 pivotally connected respectively at 72 and 74 to a pair of brake shoes 76 and 78 disposed on opposite sides of drum 22 with respective linings 80 and 82 in confronting relation with a surface of the drum. The outer brake element 78 is also pivotally mounted at its end at 84 to a stationary member 86 to permit movement relative to the rotating drum. Vertical upward movement of rod 60 will cause upward movement of the end of lever 68 connected thereto and pivotal mounting 74 will move inwardly toward the drum causing brake 78 to pivot about point 84 so that braking surface 82 will engage the outer periphery of the drum. The inner brake element 76 will at the same time be forced outwardly against the inner periphery of the drum by virtue of the connection 72 to lever 68. As a result there is a gripping of the rotating drum, which gives a maximum braking efficiency. This emergency brake construction is illustrated by way of example and does not per se constitute part of the invention as any suitable emergency brake may be used. For further detail as to the illustrated brake, if needed, reference is made to U. S. Patent No. 2,239,977.

Referring now to Figure 3, the details of the actuating and locking mechanism of this invention are illustrated in a neutral position. Hand lever 28 is provided at its forward lower end with a dependent leg 88 having an aperture 90 for loosely receiving rod 30. Opposite sides of the leg within aperture 90 are cut away to provide curved surfaces 92 and 94 to permit smooth pivotal movement of lever 28 about rod 30. Leg 88 also has a downwardly and outwardly extending inclined rear face 96, the purpose of which will hereinafter be more fully set forth. Lever 28 is further formed at its rear lower end with an integral brake release lug 98.

A pair of wobble plates 100 and 102 having centrally disposed circular apertures 101 and 103 respectively larger in diameter than rod 30 are disposed within housing 26 on opposite sides of release lug 98 of lever 28. As illustrated in Figure 7, these wobble plates are rectangular or some suitable shape so as to be longitudinally slidable but not rotatable within housing 26. A coiled compression spring 104 is mounted on rod 30 between wobble plates 100 and 102, and it biases plate 100 against inclined rear face 96 of leg 88. As a result of the loose fit of plate 100 about shaft 30, plate 100 is tilted forwardly (to the left in Figure 3) under the pressure of spring 104, forming a small angle A with respect to a plane perpendicular to the axis of rod 30 when the parts are in the position of Figure 3.

Housing 26 is also provided with an integral block 106 having a flat face 108 which is slightly offset rearwardly with respect to a flat face 110 on brake release lug 98 when the parts are as in Figure 3. Wobble plate 102 is biased against face 108 by a U-shaped leaf spring 112 having enlarged apertures 114 in each of its legs to permit free passage of rod 30. Spring 112 is compressed between wobble plate 102 and the rear wall 116 of housing 26. Since plate 102 is loosely mounted on rod 30 and is supported solely by block 106 at its lower end and is urged forwardly by the upper end of the forward leg of spring 112, it will be tilted on the rod 30 to form an angle B with respect to the plane of face 108 when the parts are positioned as in Figure 3.

A curved upper end portion 118 on the rear leg of the U-shaped leaf spring 112 extends upwardly from housing 26 into contact with a shoulder 120 on hand lever 28 and this supports the lever 28 in the neutral position. Leg 88 of the hand lever is provided at its lower front end with a forwardly and laterally extending projection 122 for engaging a stop 124 integral with front wall 126 of housing 26 for a purpose to appear.

In the neutral position of Figure 3, and during the brake setting operation to be described, lever 28 under the biasing effect of coil spring 104 is forced toward the front end wall 126 of the housing so that a knee portion 128 is maintained in contact with wall 126. Knee 128 functions as a sliding fulcrum for the lever during the brake setting strokes.

Referring now to Figure 4 in conjunction with Figure 3, I will describe how the mechanism is actuated to set the brakes. Lever 28 is first rocked counterclockwise so that the lever pivots about knee 128 which may slide down in contact with wall 126. The lower portion of leg 88 applies an eccentric force to wobble plate 100 and tends to further tilt plate 100 forwardly causing diametrically opposed edges on opposite sides of the aperture 101 to firmly grip rod 30 in the initial movement of the hand lever. Further movement of lever 28 causes compression of spring 104. Initial movement of rod 30 to the right reduces the locking forces exerted on plate 102 by the coaction of block 106 and spring 112 and allows rod 30 relative movement through aperture 103. Spring 112 and block 106 continue to hold wobble plate 102 in a cocked position ready to lock rod 30 the instant there is any tendency of the rod to move to the left. This displacement of rod 30 continues until the end of this stroke, which is defined by contact of wobble plate 100 with flat front face 130 of block 106 as shown in Figure 4.

Then lever 28 is rocked clockwise until shoulder 120 contacts upper end 118 of the leaf spring 112 which signals to the operator that the limit of back stroke has been reached. During this movement of the lever, the eccentric tilting force is removed from wobble plate 100. Spring 104 now expands to tilt plate 100 into centered alignment with rod 30, thereby releasing its grip on the rod. At the same time leaf spring 112 and face 108 of block 106 exert eccentric force on tilted wobble plate 102, as clearly appears in Figure 5, so that it securely grips rod 30 to prevent the rod from sliding back under the biasing effect of spring 32. Thus there is substantially no movement of rod 30 during this back stroke.

A series of these short actuating strokes is taken between neutral position and the position of Figure 4 until the absolute maximum braking force is applied to the drum 22 by the brake shoes 80 and 82. The condition of the actuating mechanism at maximum braking is illustrated by Figure 5 wherein rod 30 projects a substantial distance beyond rear wall 116 of housing 26. In this condition the lever 28 is stopped in neutral position and wobble plates 100 and 102 are in the same condition as that shown in Figure 3, that is both plates are tilted with respect to the shaft 30 so that diametrically opposed edges of the apertures 101 and 103 firmly grip rod 30 and lock it in the position illustrated in Figure 5.

It will thus be seen that wearing of the brake shoes 80 and 82 does not materially affect the efficiency of this device since nominal wearing merely requires additional short strokes of the lever to attain maximum braking force. Should the brake shoe 80 and 82 wear materially, rod 60 can be repositioned so that the hook element 58 will engage one of the other apertures 56 on bell crank 50. In this way the shoes 80 and 82 are moved closer to drum 22 to compensate for wear and their full life is utilized.

In order to release the brake, lever 28 is moved clockwise in the direction of the arrow as illustrated in Figure 6. During this movement shoulder 120 encounters resilient stop 118 which is the normal back stroke limit and then forcibly overcomes that stop. Upon this movement of lever 28 face 110 of the release lug 98 contacts the upper edge of wobble plate 102 and overcomes the locking forces exerted on wobble plate 102 by the combined action of block 106 and spring 112 and, as a result, the edge of aperture 103 no longer grips the rod 30 with sufficient locking force to prevent relative movement under the strong biasing force exerted by return spring 32. At the same time rotation of leg 88 through an angle up to such an angle as angle "A" overcomes the locking forces on wobble plate 100 so that the edges of the apertures 101 no longer grip the rod 30 with sufficient locking force to prevent relative movement under the strong biasing force exerted by return spring 32. The wobble plates 100 or 102, whichever is unlocked first, will be rotated through an angle probably less than the respective angles A and B of Figure 3 until the other wobble plate is unlocked.

In order to prevent clockwise overtravel of lever 28 and the consequent locking of wobble plates 100 and 102 in the reverse direction, housing 26 is provided on its forward wall 126 with the previously described inwardly extending stop 124. When lever 28 has been moved through a sufficient angle to set the wobble plates 100 and 102 in their rod releasing position, projection 122 on the lever engages stop 124 to preclude further movement of the lever in that direction and thereby assure the release of rod 30. It will be appreciated, however, that if desired coacting stop members 122 and 124 may be omitted, in which case the top and bottom of aperture 90 in leg 88 coming into abutment with the top and bottom respectively of rod 30 would act as stops to prevent such overtravel.

The actuating mechanism shown in Figure 8 is a modification of the embodiment shown in Figures 1 to 7. The housing generally designated 132 has integral bosses 134 having axially aligned bores for slidably receiving shaft 30. A pair of diagonally opposed holes are provided in the bosses for receiving attaching members, such as bolts 136, for securing housing 132 to transmission housing 20. Lever 138 is of slightly modified form from that of lever 28 in that release lug 140 comprises a pair of faces set at an acute angle to shoulder 120 of lever 138. Two pairs of wobble plates 142, 144 and 146, 148 are employed instead of single wobble plates 100 and 102, the reason for this pairing being that if added strength is required the use of dual wobble plates permit smaller apertures therein than a single wide wobble plate and consequently require less tilting to become effective as it locks. Coil spring 150 is substituted for the leaf spring 112, if so desired.

In the neutral position as shown in Figure 8, lever 138 is supported by the face 152 of release lug 140 resting on wobble plate 146. The weight of lever 138 is insufficient to overcome the force of spring 150 and cause uncocking of wobble plates 146 and 148.

The operation of this form is similar to that shown in Figures 1 to 7 in that movement of lever 138 in the direction of arrow S will move wobble plates 142 and 144 and rod 30, which is gripped by the tilted plates, rearwardly. This rearward action overcomes the locking forces exerted on wobble plates 146 and 148 by the combined action of block 106 and spring 150 so as to permit the rod 30 to slide therethrough. Upon reverse movement of lever 138 wobble plates 146 and 148 each will tilt to lock the rod in a set position while wobble plates 142 and 144 are returned to their initial position under the biasing force of spring 104 preparatory to the next braking stroke. When the brakes are fully set rod 30 will extend rearwardly of the housing 132 in the manner shown in Figure 5, and each wobble plate 142, 144, 146 and 148 will be in a tilted locking position, as shown in Figure 8, to provide four gripping locks on the rod 30. To release the brake lever 138 is moved in the direction of arrow R so that face 152 of release lug 140 contacts plate 146 and moves both wobble plate 146 and 148 to an unlocked rod release position. At the same time face 96 of the lever moves toward a position perpendicular with respect to the axis of rod 30 to permit spring 104 to bias wobble plates 142 and 144 against face 96 in an unlocked position. With the wobble plates held in an unlocked position the rod 30 is free to slide to brake release position under the biasing force of spring 32.

In Figures 9 and 10 there is shown a further embodiment of the connection between the actuating mechanism and brake. In this form of the invention the actuating rod 30 is pivotally connected as at 154 directly on arm 156 of bell crank lever 158. Arm 160 of the bell crank is pivotally connected as at 162 to stationary pivot mounting member 164 secured to transmission housing 20.

A series of essentially vertically spaced apertures 166 are provided at the elbow of the bell crank for selectively receiving hooked end 58 of connecting rod 60, for brake adjustment. End 64 is connected to brake element actuating lever 68, as set forth in the description of Figures 1 and 2.

It will be seen that essentially horizontal movement of rod 30 will, by virtue of the connection of rod 30 with the bell crank, transmit vertical movement to connecting rod 60, actuating lever 68, and finally to the brake 76 and 78.

The brake actuating and locking mechanism as described in the foregoing has been found, in practice, to provide a practical solution to the hitherto unanswered problems of a simple, effective, and safe braking mechanism that will give maximum braking efficiency throughout the effective life of the brake elements or shoes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A brake actuating mechanism comprising a housing; a brake actuating rod slidably mounted in said housing; spaced locking plates tiltably mounted on said rod in said housing both normally biased toward rod locking position; a pivoted operating lever having a part engaging one of said plates for shifting said one plate and the rod together in one direction during a brake applying stroke of said lever; means for concomitantly unlocking the other of said plates to permit sliding of the rod therethrough during said brake applying stroke; means operative upon return stroke of said lever for locking said rod to said other plate and releasing said rod with respect to said one plate to permit said one plate to return to its normal position where it engages the rod in preparation for and prior to the start of a subsequent applying stroke of said lever; and a support mounted in said housing eccentrically engageable with said other plate when the latter is biased toward locking position.

2. A brake actuating mechanism comprising a housing; a brake actuating rod slidably mounted in said housing; spaced locking plates tiltably mounted on said rod both normally biased toward rod locking position; a pivoted operating lever alternately movable back and forth for cumulative brake applying strokes having a part engaging one of said plates for shifting said one plate and the rod together in one direction during brake applying strokes of said lever; means for concomitantly unlocking the other of said plates to permit sliding of the rod therethrough during each of said brake applying strokes; resilient means operative upon return strokes of said lever for simultaneously locking said rod to said other plate and yieldingly limiting the amount of return stroke of said lever to permit said one plate to return to its normal position where it engages the rod in preparation for and prior to the start of a subsequent applying stroke of said lever; and means positively limiting movement of said lever on a return stroke upon movement of said lever beyond the yielding limiting effect of said resilient means.

3. A brake actuating mechanism comprising a housing; a brake actuating rod slidably mounted in said housing; spaced locking plates tiltably mounted with respect to said rod both normally biased toward rod locking position; a pivoted operating lever alternately movable back and forth for cumulative brake applying strokes having a part engaging one of said plates for shifting said one plate and the rod together in one direction during brake applying strokes of said lever; means for concomitantly unlocking the other of said plates to permit sliding of the rod therethrough during each of said brake applying strokes; resilient means operative upon return strokes of said lever for simultaneously locking said rod to said other plate and yieldingly limiting the amount of return stroke of said lever to permit said one plate to return to its normal position where it engages the rod in preparation for and prior to the start of a subsequent applying stroke of said lever; means positively limiting movement of said lever on a return stroke upon movement of said lever beyond the yielding limiting effect of said resilient means; and a support eccentrically engageable with said other plate in its normal position to maintain said other plate in its tilted position.

4. The device as set forth in claim 3 wherein said lever is provided with a release portion engageable with said other plate upon movement of said lever beyond the yielding limiting effect of said resilient means and concurrently operative with said part for moving both of said plates toward untilted rod releasing position respectively; and spring means operatively engaging and biasing said rod in an opposite brake releasing direction.

5. The device as set forth in claim 3 wherein said resilient means comprises a U-shaped leaf spring eccentrically operatively engaging said other plate to normally bias said other plate against said support toward a rod locking position; and having a portion selectively engageable with said lever upon a return stroke whereby said return stroke of said lever is resiliently limited.

6. The device as set forth in claim 3 wherein said positive stop comprises a lug integrally mounted in said housing in the path of movement of said part of the lever; and a toe on said part operatively engageable with said lug when the lever is moved beyond the yielding limiting effect of said resilient means on a return stroke whereby movement of said lever is limited to permit positive unlocking movement of said plates to release said rod.

7. The device as set forth in claim 3 wherein each of said plates comprise a pair of contiguous plates tiltably mounted on said rod whereby each pair of plates provide a plurality of locks for said rod thereby minimizing the size of said plates and the amount of tilting necessary for efficient operation.

8. A brake actuating mechanism comprising an axially slidable rod, a pivotally mounted operating lever having an actuating part adjacent said rod and provided with a contact face inclined with respect to the axis of said rod for all operative positions of said lever; spaced locking plates tiltably mounted on said rod; abutment means between and eccentrically engageable by said locking plates; spring means normally biasing one of said locking plates axially with respect to said rod into engagement with said abutment means whereby said plate is normally tilted into locking engagement with said rod; and compressible spring means weaker than said first mentioned spring means reacting between said locking plates to normally bias the other locking plate against said inclined contact face whereby said other locking plate is normally tilted into locking engagement with said rod.

9. Brake actuating mechanism comprising a support; a brake actuating rod slidably mounted on said support; spaced locking plates tiltably disposed on said rod on said support; first resilient means normally biasing one of said plates into a tilted position whereby said rod may move axially in one direction and is locked against axial movement in the other direction; an operating lever pivoted with respect to said support having a normal position and including one portion offset from the axis of the rod engaging the other of said plates; second resilient means constantly biasing said other plate against said one portion of the lever whereby movement of the lever in the direction which moves the said offset portion toward the other plate will force said other plate to assume a tilted locking relation with said rod and move the rod in said one direction, and movement of the lever in the opposite direction back to its normal position will permit said other plate to be shifted in said other direction under biasing action of said second resilient means along with said lever portion while the rod is locked against movement in said other direction by the normal tilted position of said one plate; and means on said lever adapted upon movement of said lever in the opposite direction beyond its said normal position to engage and maintain both plates in positions whereby the rod is unlocked and permitted to move in said other direction without restraint by said plates.

10. An actuating mechanism as claimed in claim 9 wherein an abutment is fixed relative to said support and said first resilient means biases said one plate in said other direction into engagement with said abutment to thereby tilt said one plate on said rod to lock said rod against movement in said one direction.

11. An actuating mechanism as claimed in claim 10 wherein said first resilient means is a substantially U-shaped spring clip having one leg contacting said plate to urge it in said one direction.

References Cited in the file of this patent

UNITED STATES PATENTS

| | | |
|---|---|---|
| 480,910 | Long | Aug. 16, 1892 |
| 693,731 | Moore | Feb. 18, 1902 |
| 1,792,442 | Penny | Feb. 10, 1931 |
| 1,948,991 | Molly | Feb. 27, 1934 |
| 2,170,900 | Janus et al. | Aug. 29, 1939 |
| 2,180,307 | Lucker | Nov. 14, 1939 |
| 2,305,238 | Coates | Dec. 15, 1942 |
| 2,463,966 | Hauschild | Mar. 8, 1949 |
| 2,534,857 | Crewe | Dec. 19, 1950 |